Patented Dec. 9, 1941

2,265,914

UNITED STATES PATENT OFFICE 2,265,914

CARBOHYDRATE ETHER XANTHATES AND PROCESS OF PRODUCING SAME

Leon Lilienfeld, deceased, late of Vienna, Germany, by Antonie Lilienfeld, special administratrix, Gstaad, Switzerland; Antonie Lilienfeld, administratrix of said Leon Lilienfeld, deceased, assignor to Lilienfeld Patents Inc., Boston, Mass., a corporation of Massachusetts No Drawing. Application November 12, 1940, Serial No. 365,392. In Great Britain March 15, 1930

18 Claims. (Cl. 260—226)

In copending U. S. Patents Nos. 1,858,097 and 2,021,861, there are described and claimed the processes of making artificial materials including artificial threads (e. g. silk) in which a hydroxyalkyl derivative (ether) of cellulose was made by reacting with a halogen derivative of a polyhydric alcohol, (e. g. a chlorhydrin of a glycol or of glycerine) upon alkali cellulose, then xanthating the products by action thereupon of $CS_2$ and an alkali, e. g. NaOH. The resulting hydroxy-alkyl cellulose xanthate of an alkali metal is then dissolved in an alkaline solution, to form a viscous solution, which can then be worked up into artificial threads or other shaped products.

The xanthate, forming the intermediate product of said patents is believed to be a xanthate of a cellulose compound which contains, linked ether fashion to the cellulose, an organic radical containing an OH group.

In the inventor's further researches, it has now been found that it is possible to obtain products having properties somewhat similar, if instead of the alkali soluble or alkali insoluble hydroxyalkyl derivatives of cellulose, alkali soluble cellulose compounds are treated, that contain, instead of hydroxyalkyl groups, alkyl radicals or aralykyl radicals or hydroxy fatty acid radicals, linked ether-fashion with the cellulose molecule, are acted upon with carbon bisulphide in the presence of a basic substance, particularly caustic alkali.

According to their mode of formation, chemical behaviour and results of analysis, the new cellulose compounds, in their free state, seem to be dithiocarbonic esters of alkyl ethers of cellulose, and in the form of their salts, xanthates of aklyl ethers of cellulose, when made from alkyl cellulose ethers which are soluble in alkali solutions.

When the products are made from cellulose ethers of alkali-soluble hydroxy-fatty acids, the products seem to be dithiocarbonic acid esters of cellulose ethers of hydroxy-fatty acids, and xanthates of cellulose ethers of hydroxy-fatty acids, respectively.

It is desired to state expressly that it is not intended to limit the invention to the methods described in Patent No. 1,858,097.

The alkali soluble cellulose ethers may be prepared not only according to the processes described in my U. S. Patents No. 1,589,606, No. 1,682,292, No. 1,682,294 or in copending application 521,022 of Mar. 7, 1931 (and a continuation application thereof, Ser. No. 314,359, filed Jan. 17, 1940), but also according to any process or method available for this purpose.

In stating that the ethers of cellulose to be xanthated, in accordance with the present invention are "alkali soluble," it is not intended to thereby indicate that the ethers must necessarily be such as will readily dissolve in caustic alkali solution at room temperature. Many of the ethers produced in following the specific examples of this case will not readily dissolve, entirely or even mostly, in alkali solutions at ordinary room temperature, but they all have the property of dissolving in the alkali solution (e. g. of the concentrations commonly used in dissolving cellulose xanthate) at temperatures much below room temperature, such as temperatures of 0 to 5° C., or even lower such as from 0° to —10° C., or even lower. This mode of dissolving alkali soluble cellulose ethers which do not dissolve in caustic alkali solution at room temperature, has been described in detail in British Patent No. 212,864, page 3 lines 62 to 71, where the dissolving of alkali soluble cellulose ethers in refrigerated caustic alkali solutions has been described for the first time. The solutions, so produced under refrigeration, do not coagulate or jellify, when brought to room temperature (or at temperatures somewhat above room temperature, e. g. 40° C.) nor even when kept at such temperatures for a protracted period.

Since the practice of the process of making the xanthates is parallel to the procedure as set forth in the aforesaid patent 1,858,097 and explained therein by aid of numerous examples, it appears superfluous to repeat here all particulars relating to the carrying out of the present process under various working conditions and to give here examples demonstrating all possible modifications of working the present invention. In conjunction with the detailed description and the examples of patent 1,858,097, the following examples appear to be sufficient to illustrate the practical execution of the invention which however, is by no way limited to these examples.

It may be mentioned that, if alkali cellulose be used as the starting material for the alkylation, it seems more advantageous to prepare the alkali cellulose by impregnating cellulose with an excess of alkali solution and removing the excess by pressing or the like, than to prepare the alkali cellulose by simply mixing the cellulose with the required amount of caustic alkali solution.

Example 1

1000 parts of wood-pulp (moisture 9 to 10 per cent) or 1000 parts of cotton linters (moisture 7 to 8 per cent) are steeped in 20,000 parts of caustic soda solution of 18 per cent strength at 15° C., and the reaction mixture is allowed to stand for 3 hours at room temperature. After this time the alkali cellulose is pressed down to 3400 parts and comminuted in a shredder for 3 hours at 12 to 13° C., whereupon 100 parts of dimethyl sulphate are added in a few portions, and the reaction mass kneaded in a shredder for about 3 hours. Thereafter the reaction mass is transferred to a vessel, provided with a lid and kept in the closed vessel for 21 hours at 20° C.

The reaction mass is now placed in a filter press or on a straining cloth and washed with water until free from alkali, whereupon it is pressed down to about three to four times the weight of the parent cellulose. The water content of the pressed product is determined by drying a sample at 105° C.

The mass is now (at 15° C.) well mixed with such amounts of water and caustic soda as to give a mass containing 20,000 parts of a caustic soda solution of 18 per cent. strength. In selecting the amounts of caustic soda and water to be used, the water content of the pressed mass is taken into consideration.

The reaction mixture is now allowed to remain at room temperature for 3 hours, whereupon it is pressed down to 3400 to 4500 parts and comminuted in a shredder for 3 hours at 12 to 13° C. Immediately after shredding, 600 parts of carbon bisulphide are added, and the reaction mass placed in a closed vessel and kept therein for 10 hours at about 19° C. The excess carbon bisulphide is blown off during 15 minutes, and the xanthated mass dissolved (e. g. at room temperature or at a lower temperature, if desired) in water and caustic soda, for example so as to yield a solution containing about 5 to 7 per cent of the dry residue (of the mass pressed after the alkylation and washing) and 8 per cent of caustic soda.

The solution is practically free from undissolved particles and can be precipitated by strong solutions of salts, for example ammonium chloride or sodium chloride or ammonium sulphate, or by alcohol or by acids or acid salts, for instance sulphuric acid or hydrochloric acid, or sodium bisulphate.

The precipitate obtained by addition of, for example, ethyl-alcohol or methyl-alcohol while stirring is collected on a filter, washed a few times with alcohol, extracted with ether and dried at room temperature under reduced pressure. The product is an almost colorless, flocculent or lumpy substance which is readily soluble in caustic alkali solution. Its solutions in alkali are precipitated on being acidified, for example with sulphuric acid.

*Example 2*

The process is conducted as in Example 1, but with the difference that, instead of 100 parts, 50 parts of dimethyl sulphate are employed.

*Example 3*

The process is conducted as in Example 1, but with the difference that instead of the dimethyl sulphate 300 parts of diethyl sulphate are used. No considerable rise of temperature occurs during the reaction.

The ethyl ether of cellulose produced when following this example dissolves readily in NaOH solutions of 7 to 9% strength, cold, and the solution does not jellify when being brought to room temperature. (This solution can be kept for at least several weeks, and will remain fluid, during that time.) The ether is insoluble in water. Acidifying the alkaline solution of the ether will precipitate the ether. The ether, before or after purification by washing and xanthated with NaOH and $CS_2$ (e. g. in the amount given in Example 1) gives a xanthate which dissolves readily in NaOH solution of about 7 to 9% strength (e. g. at room temperature or refrigerated) giving an easily filterable solution. A property of this solution is that, upon acidification with a mineral acid, for example sulphuric acid, the cellulose ether is regenerated and precipitates.

*Example 4*

The process is conducted as in Example 1, but with the difference that, instead of the dimethyl sulphate 600 parts of diethyl sulphate are used. No considerable rise of temperature occurs during the reaction.

*Example 5*

The process is conducted as in Example 4, but with the difference that, after the diethyl sulphate has been added, the reaction mixture is kept at 45–55° C. during the kneading step.

The etherified product produced, in Examples 4 and 5, is a white, solid substance, soluble in dilute caustic alkali solution at low temperature, and the solution does not jellify at room temperature. It is insoluble in hot water and in cold water and in acids, and in aqueous solutions of salts, whether these solutions are neutral or acid in reaction.

This ethyl cellulose, treated with carbon bisulphide and alkali, as in Example 1, gives a xanthate which readily dissolves in caustic alkali solution at room temperature, and its solution is readily workable.

*Example 6*

The process is conducted as in any one of the preceding examples with the exception that, immediately after having been mixed with the dimethyl sulphate or diethyl sulphate respectively, for 3 hours, the reaction mass is washed and then dealt with as in any of the preceding examples.

*Example 7*

Mode of procedure as in any one of the preceding examples, with the difference that the reaction mass produced by the alkylating step is, without being washed, steeped in 16,600 parts of caustic soda solution of 18% strength at 15° C. and then, by pressing, shredding and sulphidizing, worked up into the final xanthate exactly as in any one of the preceding examples.

*Example 8*

1000 parts of wood-pulp (moisture 9 to 10 per cent) or 1000 parts of cotton linters (moisture 7 to 8 per cent) are steeped in 20,000 parts of caustic soda solution of 18 per cent strength at 15° C., and the reaction mixture is allowed to stand for 3 hours at room temperature. After this time the alkali cellulose is pressed down to 3400 parts and comminuted in a shredder for 3 hours at 12 to 13° C. whereupon 200 parts of dimethyl sulphate are added in a few portions, and the reaction mass kneaded in a shredder for about 3 hours, at 20° C. Thereafter the reaction mass is transferred to a vessel, provided with a lid, and kept in the closed vessel for 21 hours at 20° C.

Immediately thereafter, 600 parts of carbon bisulphide are added and allowed to act for 8 hours at 19 to 20° C. The excess carbon bisulphide is then blown off during 15 to 20 minutes, and the thus produced xanthate dissolved, for example in such a quantity of caustic soda and water that the solution contains 5 to 7 per cent of precipitable cellulosic body and 8 per cent of NaOH.

The solution is practically free from undissolved particles and precipitable by strong solutions of salts, for example ammonium chloride or sodium chloride or ammonium sulphate, or alcohol, or acids, for instance sulphuric acid or hydrochloric acid, or acid salts, for instance sodium bisulphate.

The precipitate obtained by addition of ethyl alcohol or methyl alcohol while stirring is collected on a filter, washed a few times with alcohol, extracted with ether and dried at room temperature under reduced pressure. The product is an almost colorless, flocculent or lumpy substance which is readily soluble in caustic alkali solution and in water. Both solutions are precipitated on being acidified, for example with sulphuric acid.

Example 9

The process is conducted as in Example 8, but with the difference that, instead of 200 parts, 300 parts of dimethyl sulphate are used.

Example 10

The process is conducted as in Example 8, but with the difference that, instead of 200 parts, 100 parts of dimethyl sulphate are used.

Example 11

The process is conducted as in Example 8, but with the difference that, instead of 200 parts, 600 parts of dimethyl sulphate are used.

Example 12

The process is conducted as in Example 8, but with the exception that, instead of dimethyl sulphate, 300 to 600 parts of diethyl sulphate are employed.

Example 13

The process is conducted as in any one of the Examples 8, or 9, or 10, or 11, or 12, but with the exception that the carbon bisulphide is added immediately after the kneading step.

Example 14

The process is conducted as in any one of the preceding examples, but with the exception that the product of the xanthation reaction is dissolved in such an amount of water and caustic soda as to yield a solution containing about 5 to 8 per cent of precipitable cellulosic body and 5 per cent of NaOH.

Example 15

1000 parts of wood-pulp (moisture 9 to 10 per cent) or 1000 parts of cotton linters (moisture 7 to 8 per cent) are steeped in 20,000 parts of caustic soda solution of 18 per cent strength at 15° C., and the reaction mixture is allowed to stand for 3 hours at room temperature. After this time the alkali cellulose is pressed down to 3400 parts and comminuted in a shredder for 3 hours at 12 to 13° C. The comminuted mass is thereafter left in the shredder, whereupon 300 parts of dimethyl sulphate are added, and immediately afterwards 600 parts of carbon bisulphide are added, the shredder well closed and the kneading continued for 5 hours at about 20° C. The excess of carbon bisulphide is blown off during 15 to 20 minutes, and the xanthate is dissolved in caustic soda and water, so that the solution contains 3 to 5 per cent of precipitable cellulosic body and 8 per cent of NaOH.

Example 16

1000 parts of wood-pulp or cotton linters are placed in a shredder and 2025 parts of caustic soda solution of 20 percent strength are added in small portions, the addition occupying about 1 hour, whereafter the shredding is continued for another 90 minutes at 19° C. Then 300 parts of dimethyl sulphate are added drop by drop, and the shredding continued for 3 hours at 23° C. After that time 600 parts of carbon bisulphide are introduced, the shredder well closed, and the shredding continued for another 4 hours at 20° C. The excess carbon bisulphide is blown off and the mass worked up as in any one of the preceding examples.

Example 17

1000 parts of wood-pulp or cotton linters are steeped in 20,000 parts of caustic soda solution of 18 per cent strength at 15° C., and the reaction mixture is allowed to stand for 3 hours at room temperature. After this time the alkali cellulose is pressed down to 3400 parts and comminuted in a shredder for 3 hours at 12 to 13° C., whereupon 200 parts of dimethyl sulphate are added in a few portions, and the reaction mass kneaded in a shredder for 3 hours at 20° C. Thereafter the reaction mass is transferred to a vessel, provided with a lid, and kept in the closed vessel for 21 hours at 20° C.

A sample taken at that time shows that the mass in greater part has become soluble in dilute caustic soda solution (for instance of 10 percent strength) and that the filtered solution, on being acidified with dilute sulphuric acid, yields a bulky precipitate.

The mass is now dissolved in 75,000 parts of a caustic soda solution of 8 per cent strength, wherein it dissolves not completely, but with a residue. After standing for 12 hours at room temperature, the solution is filtered and the clear filtrate precipitated by acidifying the sulphuric acid of 15 per cent strength. The flocculent precipitate is freed from the mother liquor in a filterpress or on a straining cloth, washed with water until free from acid, pressed and after its water content has been determined, dissolved in such an amount of caustic soda and water as to yield a solution containing 4 to 7 per cent of the cellulose methyl ether and 8 per cent of NaOH. To this solution 100 per cent of carbon bisulphide (calculated on the weight of the cellulose methyl ether) are added and the reaction mixture kept with shaking for 20 hours at 20° C.

Example 18

The process is conducted as in Example 17, but with the difference that, instead of 200 parts, 100 parts of dimethyl sulphate are employed.

Example 19

The process is conducted as in Example 17, but with the difference that, instead of the 200 parts, 300 to 600 parts of dimethyl sulphate are used, and that the washed product of the reaction between the alkali cellulose and the dimethyl sulphate (after its water content has been determined) is, without being purified, dissolved direct in such a quantity of water and caustic soda as to yield a solution containing about 5 to 7 per cent of the cellulose methyl ether and 8 per cent of NaOH. To this clear solution which is free from undissolved particles the carbon bisulphide is added and the process is conducted as described in Example 17.

The methylated celluloses and the ethylated products produced in the above examples (using the quantities and conditions set forth in these several examples), after being isolated, purified, washed and dried, and when being decomposed by strong hydriodic acid by the well known Zeisel method, have been found to contain between 0.37% and 1.60% of methyl ($CH_3$) or between 2.66% and 4.31% of ethyl ($C_2H_5$).

Or, stated in other words, the alkyl ethers produced in the examples contain one methyl group to each 5.35 to 23 $C_6H_{10}O_5$-molecular units of cellulose, or one ethyl group to each 3.54 to 5.73 $C_6H_{10}O_5$-molecular units of cellulose.

These alkyl celluloses are "alkali soluble", and all are suitable for being xanthated. In all cases these alkyl ethers dissolve in 8 to 10% NaOH solution, in the cold, i. e. at some temperature between —10° C. and +5° C., and the solutions so formed remain stable at room temperature or at somewhat higher temperatures, e. g. at 25 to 30° C.

*Example 20*

The process is conducted as in Example 1, but with the difference that instead of the dimethyl sulphate, 300 parts of monochloracetic acid (in the form of an aqueous solution of its sodium salt) are employed.

In this example, the monochloracetic acid is added in the form of its sodium salt (i. e. sodium chloracetate). When this salt reacts with the soda cellulose, the chlorine atom of the chloracetate combines with a sodium atom of the soda cellulose (forming sodium chloride), and the ether-forming hydroxyacetate radical (the —$CH_2COONa$ attaches to the cellulose residue, forming a glycollate ether, as typical of the hydroxy-carboxylate radicals —$C_nH_{2n}COOX$, in which X may be sodium, etc.)

*Example 21*

The process is conducted as in Example 20, but with the difference that, instead of 300 parts, 100 parts of monochloracetic acid are employed.

*Example 22*

1000 parts of wood-pulp (moisture 9 to 10 per cent) or 1000 parts of cotton linters (moisture 7 to 8 per cent) are steeped in 20,000 parts of caustic soda solution of 18 per cent strength at 15° C., and the reaction mixture is allowed to stand for 3 hours at room temperature. After this time the alkali cellulose is pressed down to 3400 parts and comminuted in a shredder for 3 hours at 12 to 13° C., whereupon 100 to 300 parts of monochloracetic acid in the form of an aqueous solution of its sodium salt, are added in a few portions, and the reaction mass kneaded in a shredder for about 3 hours at 20° C. Thereafter the reaction mass is transferred to a vessel, provided with a lid, and kept in the closed vessel for 21 hours at 20° C.

Immediately thereafter 600 parts of carbon bisulphide are added and allowed to act for 8 hours at 19 to 20° C. The excess carbon bisulphide is now blown off during 15 to 20 minutes and the xanthate thus produced is dissolved, for example in such a quantity of caustic soda and water that the solution contains about 6 per cent of precipitable cellulosic body and 8 per cent of NaOH.

The solution is practically free from undissolved particles and precipitable by strong solutions of salts, for example ammonium chloride or sodium chloride or ammonium sulphate, or alcohol, or acids, for instance sulphuric acid or hydrochloric acid, or acid salts, for instance sodium bisulphate.

The precipitate obtained by addition of ethyl alcohol or methyl alcohol while stirring is collected on a filter, washed a few times with alcohol, extracted with ether and dried at room temperature under reduced pressure. The product is an almost colorless, flocculent or lumpy substance which is readily soluble in caustic alkali solution and water. Both solutions are precipitated on being acidified, for example with sulphuric acid.

*Example 23*

The process is conducted as in Example 22, but with the difference that instead of 100 to 300 parts, 500 parts of monochloracetic acid are used.

*Example 24*

The process is conducted as in Example 22 or 23, but with the difference that the carbon bisulphide is added immediately after the kneading step.

*Example 25*

The process is conducted as in Example 17, but with the difference that, instead of the dimethyl sulphate, 300 parts of monochloracetic acid in the form of its sodium salt are used.

*Example 26*

The process is conducted as in Example 25, but with the difference that, instead of 300 parts, 200 parts of monochloracetic acid are employed.

*Example 27*

The process is conducted as in Example 19, but with the difference that, instead of the 600 parts of dimethyl sulphate, 400 to 500 parts of monochloracetic acid in the form of its sodium salt are used.

In the above examples in which chloracetic acid (or its sodium salt) is used, the hydroxyacetic acid ethers formed, are also "alkali soluble," after being purified, washed and dried. Obviously the degree of etherification (ratio of hydroxyacid radical to $C_6H_{10}O_5$ units) will vary when different amounts of the chloracetic acid (or its salts) are employed. In all of these examples dealing with the preparation of hydroxyacid ethers (glycollic acid ethers) of cellulose, and their subsequent xanthation, the ethers appear to contain several $C_6H_{10}O_5$-molecular units of cellulose to one hydroxy acid radical.

*Example 28*

Mode of procedure as in Examples 1 to 16 and 20 to 24, but with the difference that the initial alkali cellulose is allowed to mature for 48 to 72 hours at 15 or 20° C.

Thus, for example, when in Example 11, (see also Example 13), before being methylated, the alkali cellulose is matured for 48 hours, the methyl ether of cellulose produced is found (after thorough washing) to contain about 3.22% of $CH_3$ radical introduced (i. e. it contains, per one methyl group about 2.64 $C_6H_{10}O_5$-molecular units of cellulose). It dissolves readily in caustic soda solution of 7 to 9% strength, cold, and the solution does not jellify when brought to room temperature. The solution can be kept for at least several weeks, and will remain fluid during that period. The methyl ether is insoluble in water. When (without or with washing) it is xanthated with $CS_2$ in the presence of NaOH, the ether gives a xanthate that is readily soluble in NaOH of about 7 to 9% strength, the solution thus obtained being easily filterable and easily convertible into film or threads or other useful articles.

Example 29

In the foregoing examples relating to the xanthating of alkyl derivatives of cellulose, the processes described in my U. S. Patent No. 1,589,606 (for instance in the Examples I, II or III thereof) and in my copending application 521,022, can be employed for the production of the alkyl derivatives (ethers) of cellulose, to be xanthated.

The two following examples are continued from copending application 521,017, filed Mar. 7, 1931.

Example 30

1,000 parts of wood-pulp or cotton linters are steeped in 20,000 parts of caustic soda solution of 20% strength at 15° C. and the reacting mixture allowed to stand for 3 hours at 15° C. whereupon the alkali cellulose is pressed down to 2,000 parts and comminuted in a shredder for 3 hours at 15° C. The shredded alkali cellulose (after having been matured for 3 days at 18 to 20° C.), is placed in a rotating drum whereupon 600 parts of benzyl chloride are added and the reacting mass heated, by means of a water bath in which the drum rotates, up to 52 to 55° C. which temperature is maintained for 8 hours. After that time the crude reaction mass is extracted several times with alcohol of 95 per cent strength and then washed with water and pressed down to 2200 parts. The pressed cake is comminuted and well mixed with 4600 parts of caustic soda solution of 22 per cent strength at 18° C.

The reaction mass is now allowed to stand for 24 hours at 18° C. and then pressed down to 2000 parts. The pressed cake is comminuted in a shredder for 3 hours at 11° C. and then kept in a closed vessel for 72 hours at 21° C. whereupon 600 parts of carbon bisulphide are added and allowed to react for 10 hours at 20° C. After the excess of the carbon bisulphide has been blown off, the reaction mass is dissolved in so much water and caustic soda as to yield a solution containing about 6 to 7 per cent of precipitable cellulosic substance and 8 per cent of NaOH.

The solution of this benzyl (aralkyl) cellulose ether xanthate can be aged for 48 hours at 15° C., before spinning.

Example 31

The process is conducted as in Example 30, but with the difference that, after the benzylating step, the reaction mass is, without being washed, acted upon with 600 parts of carbon bisulphide for 10 hours at 20° C. The resultant mass is dissolved in such a quantity of water and caustic soda as to yield a solution containing about 6 to 7 per cent of precipitable cellulosic substance and 8 per cent of NaOH.

The diluted solution, after having aged for 48 hours at 15° C., can be spun in a manner described in the examples of U. S. Patent 2,021,861.

The benzyl ethers of cellulose prepared as in Examples 30 and 31, seem to contain several $C_6H_{10}O_5$-molecular units of cellulose to one benzyl group.

In the foregoing examples, in making the ethers of cellulose a small amount of a catalyzer, for example of a metal salt, such as copper salt, nickel salt, silver salt, zinc salt, iron salt or the like, may be added to the alkali cellulose or reacting mixture.

If desired, or expedient, in the foregoing examples relating to chlorine derivatives equivalent quantities of the corresponding bromine or iodine derivatives may be employed.

In the foregoing examples, relating to the production and xanthation of cellulose ethers of glycollic acid, instead of the chloracetic acid, a halogen derivative of a homologue of acetic acid, for instance, α-bromopropionic acid, or α-bromoisobutyric acid or the like or an alkali salt or an ester thereof may be employed. The use of chloracetic acid $Cl-CH_2-COOH$ gives rise to the production of a substance containing the radical $-CH_2-COOH$, and the use of homologues of chloracetic acid gives substances containing the groups $-C_2H_4-COOH$, $-C_3H_6-COOH$ etc. or in other words $-C_nH_{2n}-COOH$.

Also in place of the chloro-acetic acid or its homologues (or the corresponding bromine compounds as mentioned above) a halogen derivative of another carboxylic acid can be used in the same manner, to form another hydroxy-carboxylic acid ether of cellulose, and this latter xanthated as above described. Thus bromosuccinic acid can be used to form the malic acid ether of cellulose, and this latter then xanthated.

In the foregoing examples, instead of caustic soda, another alkali hydroxide, such as caustic potash, may be used.

In the foregoing examples, instead of caustic alkalies, sulphonium hydroxides (for instance trimethyl-sulphonium hydroxide) may be used. These substances, collectively, are hereinafter included in the term "alkali."

Instead of cellulose, its near conversion products, such as cellulose hydrate or hydrocellulose or oxycellulose, may be used in the foregoing examples.

In the foregoing examples, the reaction or the dissolution of the reaction products may occur at low temperatures also, for example at 0° C. or minus 5 to minus 10° C.

The making of artificial bodies (threads, silk, etc.) from these cellulose compounds, and the products thereof, is claimed in the application 521,017, filed March 7, 1931, and a continuation application of this latter, Ser. No. 353,420, filed Aug. 20, 1940.

The present application is in major part a continuation of copending application 521,023, filed March 7, 1931, and also is in part a continuation of copending application 521,017.

It was a well known fact, long prior to the filing of the parent application 521,023 on March 7, 1931, (and prior to March 15, 1930, when the corresponding British case was filed, now British Patent 357,167) that certain cellulose ethers of a low degree of etherification, possessed the property of being soluble in alkali solution, and as regards the alkyl ethers, it was only those of a low degree of etherification that are alkali soluble. These facts were well known from Dr. Lilienfeld's earlier patents, including U. S. 1,589,606; 1,589,607; 1,682,292 and 1,682,294, in particular showing alkyl ethers and glycollic acid ethers of cellulose, somewhat similar to these constituting the intermediate product herein. Furthermore the proportions of alkylating reagents specified in the above examples can give only ethers of a low degree of etherification. The examples as given above and the products actually produced thereby, (using the numerically stated amounts of etherifying agents, as given in the examples and the conditions as stated in the examples) can be tabulated as follows, the column A giving the number of the example, the data in column B being the amount and kind of etherifying agent brought together with 1000 parts of original cellulosic raw material (in the presence of alkali), the data in column C being the amount and kind of radical substituted for hydroxyl hydrogen of the cellulose, when following the steps set forth in the example, the data in the column D being the number of $C_6H_{10}O_5$-equivalents, (sometimes called in the literature "glucose residues") in combination with one such substituted group.

The data in column C of this table, for Examples 1 to 19 inclusive, is the result of analysis (Zeisel method) of the alkyl ethers, before xanthation, and after isolation and purification. The data in column D opposite to each of these alkyl per cent figures, is computed from the respective figure in column C. The figures in column D, Examples 20 to 27, are computed simply from the amount of the chloracetic acid used, and the amount of the cellulose.

(The following abbreviations are used in the table for saving space: $Me_2SO_4$ is dimethyl sulphate, $Et_2SO_4$ is diethyl sulphate, Cl-acid is monochloracetic acid.)

Those methyl and ethyl ethers of cellulose that contain one alkyl group combined with more than four (and up to about say eight) $C_6H_{10}O_5$-molecular units of cellulose are readily soluble in alkali solutions and the solutions do not jellify (nor coagulate) when they are warmed up to room temperature.

In stating that the ethers of cellulose used herein are soluble in alkali-solution, that does not imply that the whole of the crude product of etherification can be dissolved in alkali solution, without leaving any undissolved residue. Cellulosic material such as wood-pulp or cotton linters of the grades usually employed commercially for making soluble cellulosic derivatives (e. g. viscose, cuprammonia cellulose solution, cellulose acetate, cellulose ethers, etc.) usually contains a small percentage of other substances which are insoluble in alkali solution. Hence, to get the solution tolerably clear, it is necessary to filter the solution, as is customary in making all kinds of cellulosic solutions from commercial raw materials.

The cellulose alkyl ethers which are not soluble in alkali solution (i. e. cellulose alkyl ethers or cellulose glycolic acid ethers, other than "alkali soluble" ethers), are of no practical utility for being xanthated to give xanthates suitable for being usefully converted into regenerated struc- Table A

| A Example | B | C | D |
|---|---|---|---|
| 1 | 100 $Me_2SO_4$ | 0.67% $CH_3$ (by analysis) | 12.7 |
| 2 | 50 $Me_2SO_4$ | 0.37% $CH_3$ (by analysis) | 23 |
| 3 | 300 $Et_2SO_4$ | 2.66% $C_2H_5$ (by analysis) | 5.73 |
| 4 and 5 | 600 $Et_2SO_4$ | 4.31% $C_2H_5$ (by analysis) | 3.54 |
| 8 | 200 $Me_2SO_4$ | 1.37% $CH_3$ (by analysis) | 6.5 |
| 9 | 300 $Me_2SO_4$ | 1.51% $CH_3$ (by analysis) | 5.6 |
| 10 | 100 $Me_2SO_4$ | 0.67% $CH_3$ (by analysis) | 12.7 |
| 11 | 600 $Me_2SO_4$ | 1.60% $CH_3$ (by analysis) | 5.35 |
| 12 | 300-600 $Et_2SO_4$ | 2.66 to 4.31% $C_2H_5$ | 5.73 to 3.54 |
| 15 | 300 $Me_2SO_4$ | 1.51% $CH_3$ (by analysis) | 5.6 |
| 16 | 300 $Me_2SO_4$ | 1.51% $CH_3$ (by analysis) | 5.6 |
| 17 | 200 $Me_2SO_4$ | 1.37% $CH_3$ (by analysis) | 6.5 |
| 18 | 100 $Me_2SO_4$ | 0.67% $CH_3$ (by analysis) | 12.7 |
| 19 | 300-600 $Me_2SO_4$ | 1.51 to 1.60% $CH_3$ (by analysis) | 5.6 to 5.35 |
| 20 | 300 Cl-acid | | 1.94 (computed) |
| 21 | 100 Cl-acid | | 5.8 (computed) |
| 22 | 100-300 Cl-acid | | 5.8 to 1.94 (computed) |
| 23 | 500 Cl-acid | Not determined | 1.14 (computed) |
| 25 | 300 Cl-acid | | 1.94 (computed) |
| 26 | 200 Cl-acid | | 2.91 (computed) |
| 27 | 400-500 Cl-acid | | 1.45 to 1.14 (computed) |

The cellulose ethers produced in the examples are all (before being xanthated) soluble in alkali solution, for example in a 5 to 10% solution of NaOH. The said ethers dissolve readily in the alkali solution at low temperatures, such as 0° C. or at minus 5 to 10° C., these solutions of the ethers remain substantially clear when warmed up to room temperatures or to temperature somewhat above normal room temperatures, such as 20° C. or 25° C.

The Examples 1 to 19 of this application show the production of the methyl derivatives and the ethyl derivatives, which are the most practical of the alkyl cellulose ethers to employ, but the invention is not limited to these. Generally, most alkyl ethers of cellulose, which contain one alkyl group combined with more than two (preferably more than four) $C_6H_{10}O_5$-molecular equivalents of cellulose, are alkali-soluble and those are of the type produced by the above Examples 1 to 19. The property of being alkali-soluble is the most important property which distinguishes the alkyl ethers of cellulose that give technically useful xanthates, from those that do not.

tures, such as artificial threads (including artificial silk), films and the like.

The novel alkyl ethers of cellulose and their mode of production, as described herein are not claimed in the present application, but in a copending application Serial No. 314,359, filed January 17, 1940.

There is no practical method known, for working up a xanthate of an alkali-insoluble ether of cellulose into useful regenerated structures (artificial threads, films and the like).

In this specification and in the claims, the expression "hydroxy-carboxylic acid" is intended to include the free acid and the salts thereof. Obviously, in the presence of alkali the acid is converted into the alkali salt of the respective acid and the cellulose ethers of hydroxy-carboxylic acids likewise are converted into the cellulose ethers of the salts of the respective hydroxy-carboxylic acid.

What is claimed is:

1. A xanthate of a celluose ether which ether contains one ether-forming radical to several $C_6H_{10}O_5$-molecular units of cellulose, said ether being substantially insoluble in water but soluble in caustic alkali solutions, and the ether-forming radical being selected from the group consisting of alkyl radicals, aralkyl radicals, ether-forming hydroxy-carboxylic acid radicals, and ether-forming hydroxy-carboxylate radicals.

2. As a new cellulosic material, a xanthate of an alkali soluble water-insoluble ether of cellulose which ether consists of cellulose in which a hydroxyl hydrogen atom of the cellulose molecule is substituted by an ether-forming radical selected from the herein described group consisting of alkyl radicals, arakyl radicals, ether-forming hydroxy-carboxylic acid radicals and ether-forming hydroxy-carboxylate radicals.

3. A xanthate of an alkyl ether of cellulose in which the alkyl radical contains not over two carbon atoms, and which alkyl ether itself contains not more than one alkyl group to several $C_6H_{10}O_5$-molecular units of cellulose.

4. An alkaline solution of a product as set forth in claim 1.

5. A xanthate of an ethyl ether of cellulose, said xanthate being soluble in dilute aqueous caustic alkali solution at ordinary atmospheric temperature.

6. A solution of an ethyl cellulose xanthate in dilute caustic alkali solution, said xanthate containing only one ethyl group to a plurality of $C_6H_{10}O_5$-molecular units of cellulose.

7. A soluble xanthate of an aralkyl ether of cellulose.

8. A soluble xanthate of an alkali soluble aralkyl ether of cellulose.

9. As a new cellulose derivative, a xanthate of an alkali soluble alkyl ether of cellulose, such product being soluble in an aqueous caustic alkali solution.

10. A cellulose derivative which contains a xanthate of an alkali soluble hydroxy carboxylic acid ether of cellulose.

11. A xanthate of an alkyl ether of cellulose, in which the alkyl radical contains not over two carbon atoms, and which alkyl ether itself contains not below 3.54 $C_6H_{10}O_5$-molecular units of cellulose per one alkyl group substituted, such xanthate being soluble in dilute alkali solution.

12. A xanthate of an ethyl ether of cellulose containing one ethyl group to several $C_6H_{10}O_5$-molecular units of cellulose.

13. A soluble xanthate of an alkali-soluble hydroxy-fatty acid ether of cellulose, which ether contains one hydroxy-acid residue to several $C_6H_{10}O_5$-molecular units of cellulose.

14. A soluble xanthate of a hydroxy fatty acid ether of cellulose, which ether is substantially identical with one made by reacting upon cellulose in contact with an 18% aqueous solution of caustic soda with a halogen fatty acid, in the proportions of about 1000 parts of cellulose to 100 to 500 parts (figured as mono-chloracetic acid) of the halogen fatty acid.

15. A process of making xanthates of cellulose compounds which comprises reacting with carbon bisulfide and an alkali upon an alkali-soluble water-insoluble cellulose ether in which a hydroxyl hydrogen atom of the cellulose is substituted by an ether-forming radical selected from the herein described group consisting of alkyl radicals, aralkyl radicals, ether-forming hydroxy-carboxylic acid radicals and ether-forming hydroxy-carboxylate radicals, and in which ether, for each ether-forming radical, there are present several $C_6H_{10}O_5$-molecular units of cellulose.

16. A process which comprises reacting on cellulose in contact with an aqueous solution of a caustic alkali with not more than 0.4 mol. of an alkylating agent, per one $C_6H_{10}O_5$-molecular unit of cellulose, and xanthating the ether.

17. A process which comprises reacting on one mol of cellulose $C_6H_{10}O_5$ in contact with an aqueous solution of a caustic alkali, with less than one mol. of a salt of a halogen fatty acid, and xanthating the product.

18. A process which comprises reacting upon cellulose in contact with an aqueous solution of caustic alkali with an aralkylating reagent in such proportions as to form an alkali-soluble water-insoluble aralkyl ether of cellulose, and reacting on said ether with carbon bisulphide in contact with a caustic alkali to form a soluble xanthate of an aralkyl ether of cellulose.

ANTONIE LILIENFELD,
Special Administratrix of the Estate of Leon Lilienfeld, Deceased.